United States Patent
Wise et al.

(10) Patent No.: US 11,768,670 B2
(45) Date of Patent: Sep. 26, 2023

(54) GENERATING CUSTOMIZED WELLBORE SOFTWARE APPLICATION INSTALLER FOR DEPLOYMENT IN A WELLBORE COMPUTING NETWORK

(71) Applicant: Halliburton Energy Services, Inc., Houston, TX (US)

(72) Inventors: Matthew Edwin Wise, Sugar Land, TX (US); David Paul Welch, Houston, TX (US); Mahdi Parak, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 560 days.

(21) Appl. No.: 16/967,310

(22) PCT Filed: May 19, 2020

(86) PCT No.: PCT/US2020/033629
§ 371 (c)(1),
(2) Date: Aug. 4, 2020

(87) PCT Pub. No.: WO2021/091594
PCT Pub. Date: May 14, 2021

(65) Prior Publication Data
US 2023/0101628 A1    Mar. 30, 2023

Related U.S. Application Data

(60) Provisional application No. 62/932,736, filed on Nov. 8, 2019.

(51) Int. Cl.
*G06F 8/61* (2018.01)
*G06F 9/445* (2018.01)

(52) U.S. Cl.
CPC ................ *G06F 8/63* (2013.01); *G06F 9/44505* (2013.01)

(58) Field of Classification Search
None
See application file for complete search history.

(56) References Cited

U.S. PATENT DOCUMENTS 8,616,274 B2* 12/2013 Belcher et al. ...... H04L 65/762
340/853.3
8,789,155 B2* 7/2014 Jirka et al. .......... G06F 9/44505
726/19

(Continued)

FOREIGN PATENT DOCUMENTS

WO    2019051439    3/2019

OTHER PUBLICATIONS

PCT Application No. PCT/US2020/033629, International Search Report and Written Opinion, Mailed On Aug. 28, 2020, 13 pages.

*Primary Examiner* — Marina Lee
(74) *Attorney, Agent, or Firm* — Kilpatrick Townsend & Stockton LLP

(57) ABSTRACT

A container stack configurator can build customized software applications and deploy the applications to a wellbore computing network or through offline installer devices. The stack configurator can receive a selection from a user of a configuration repository. The stack configurator can determine available branches of the configuration repository including images, tags, and container names. The stack configurator can present a list of services associated with the container names to the user using a user interface. The stack configurator can receive a selection of an installer type and generate a customized build of the installer type. The customized build of the installer can be an offline installer that is deployable on an offline target machine using a first communication media or an online installer that is deployable to an online target machine using a second communication media.

20 Claims, 5 Drawing Sheets

(56) References Cited

U.S. PATENT DOCUMENTS

| | | | |
|---|---|---|---|
| 10,936,334 B2* | 3/2021 | Nadella et al. | G06F 11/3688 |
| 2003/0121024 A1* | 6/2003 | Hill et al. | G06F 8/71 717/115 |
| 2009/0320014 A1* | 12/2009 | Sudhakar | G06F 9/45533 717/169 |
| 2014/0102712 A1 | 4/2014 | Gutierrez et al. | |
| 2015/0121361 A1 | 4/2015 | Li et al. | |
| 2016/0162451 A1 | 6/2016 | Xu et al. | |
| 2017/0331885 A1 | 11/2017 | Jakatdar et al. | |

* cited by examiner

GENERATING CUSTOMIZED WELLBORE SOFTWARE APPLICATION INSTALLER FOR DEPLOYMENT IN A WELLBORE COMPUTING NETWORK

CROSS REFERENCE TO RELATED APPLICATION

This claims priority to U.S. Provisional Pat. Application No. 62/932,736 filed on Nov. 8, 2019, titled "Container Stack Configurator for Development of Micro-Services," the disclosure of which is hereby incorporated by reference in its entirety for all purposes.

TECHNICAL FIELD

The present disclosure relates generally to using containers to distribute software applications with micro-services at austere wellbore locations and in downhole systems. More particularly, the present disclosure relates to a system that can distribute container stacks to standalone edge devices in a wellbore system.

BACKGROUND

An oil or gas well system may include a wellbore drilled through a subterranean formation. The subterranean formation may include a rock matrix permeated by oil or gas that may be extracted using the well system. During the various stages of drilling operations, computing systems of the wellbore system execute various applications on multiple devices to control the physical drilling components, such as a drill bit, or sensor devices, such as sonic sensors or electromagnetic sensors that operate the wellbore systems. Distributing and maintaining software applications on computing systems for wellbore systems may be important for performing efficient wellbore operations. However, varying network connectivity and network access to external computing systems may be limited.

DETAILED DESCRIPTION

Figure 1:
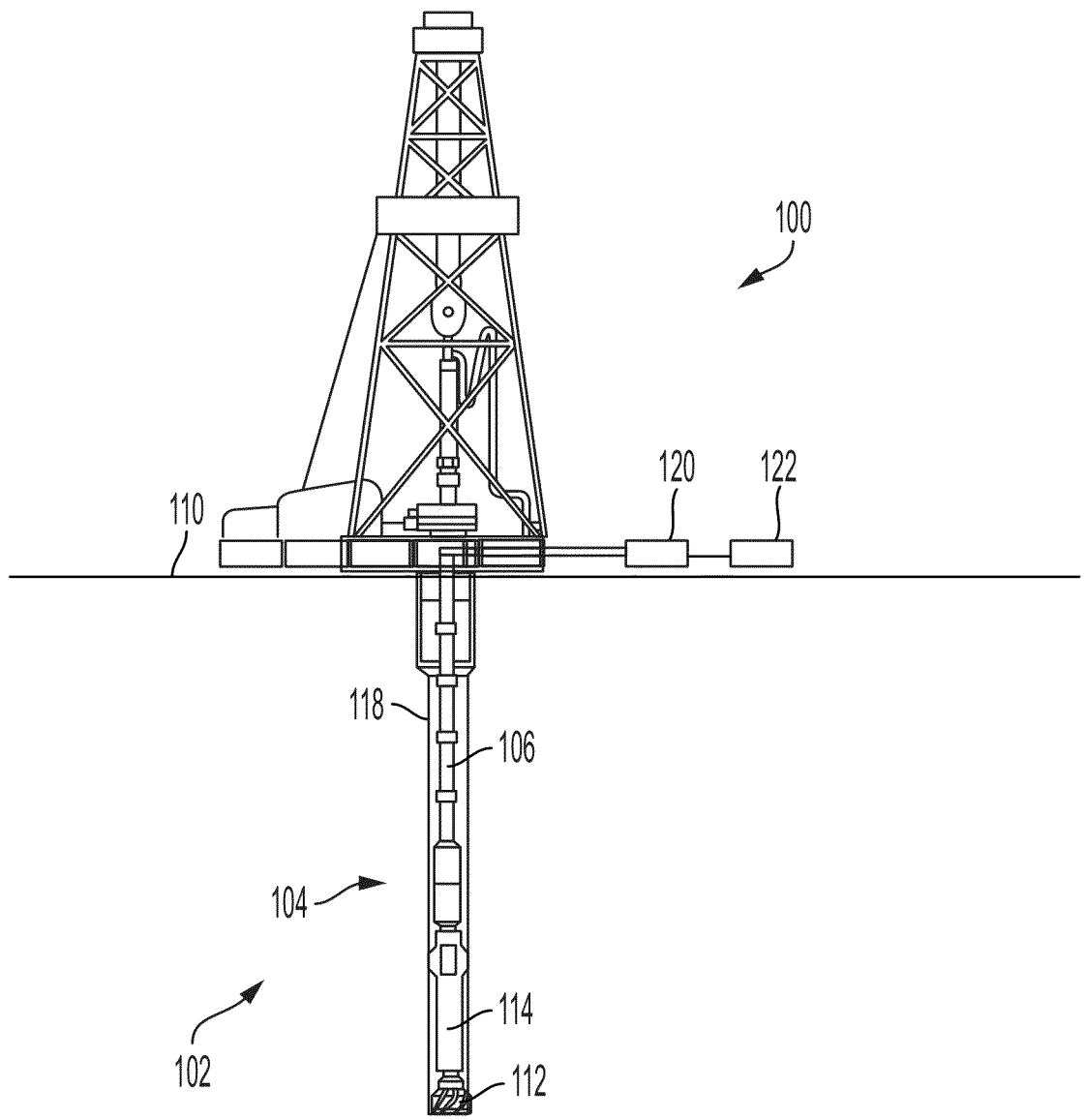
FIG. 1 is a schematic view of a well system according to some aspects of the disclosure.

Certain aspects and features relate to developing and testing micro-services in a containerized environment and deploying the micro-services to a wellbore system. Containerized environments split computer code between multiple repositories and many services may be deployed together to build a functional application. A container stack configurator provides a process and user interface to select the stacks of containers to be integrated and tested together. The container stack configurator can be run for a local development environment, a cloud development environment, or a combination thereof. At wellbore locations with multiple systems in a connectivity limited environment, deploying containerized micro-services or applications may be more difficult than in connected online distributions.

In application development, container stacks can include various services and versions available in a source code repository. The container stacks can be customized, built, and installed as an offline or online installer to a client machine or cloud-based instance. The disclosed approach may enable software developers to select exact software applications to be delivered and tested from a user interface, an automated generation of customized installers for container based software, and the ability to handle complex multi-stack service deployments from a single-user interface. The disclosed approach may further enable software developers to deploy the software application via a cloud or local customized installer.

In one example, the container stack configurator may receive a selection of a configuration repository in source control using a published application programming interface (API) from a user. An example of a configuration repository may be a central file storage location in a memory of a computing system for storing various files containing computer code executable by a processor. The configuration repository may be accessible via source control which may be a software development management structure to monitor changes or revisions to the configuration repository. A published API may be a stable version of a software component that has been made available for use by developers. The published API may be a static file or component of computer code that performs a specific process and may be updated by releasing a new version rather than modifying the previously released version.

The selection of the configuration repository may be performed through a user interface presented to the user. Once the configuration repository is selected in the source control, a Configurator API Service (CAS) may cache (e.g., store in a memory location of the CAS) this information with a unique client ID based on a cookie. The CAS may query the configuration repository and collect the available branches (e.g., computer program code components) that contain a manifest file in the root location of the configuration repository. A manifest file may be a file that includes metadata for one or more groups of files that are used to build a software application. The CAS may return the list of available branches and the CAS may present the list of available branches to the user, via the user interface. In another example, for branches that do not contain a manifest file in any branch of the configuration repository, the CAS may present an error to the user and ends the selection process.

The user interface may also receive a user selection for a branch in which the user wants to work. The user selection may be from a selection received via a dropdown menu or by providing input via an accept or apply button in the user interface. The user interface may receive the user selection, and the CAS downloads the manifest file for the selected branch into its cache. The CAS may use the information inside of the manifest file to build a list of container stack names and downloads associated with container composition files for each of the container stack names. A container stack may be a group of program code components aggregated into a single computer code object. The CAS can parse each container composition file and may create a new program code object to store a name of each service, a container image path, and an image tag (e.g., a label) associated with the container. For each container service, the CAS can use a Repository API to request the available tags for each image stored in the container repository.

The CAS may iteratively receive selections from the user until the selection process is completed. As the user makes selections, the CAS may apply the compatibility rules automatically by the interface to prevent the user from selecting incompatible software (e.g., a stack that violates one or more compatibility rules). The CAS may present options for the user to apply selected changes and generate an Offline Installer, Online Installer, or both. The updated program code object (with tag selections embedded) may be uploaded back to the CAS and added to the user cache.

In one example, the CAS may receive a selection from the user to generate an Online Installer. Responsive to the selection of an Online Installer, the CAS may update the container-composition files with the selected container image tags for each service associated with the container. The CAS service may download script files from the selected configuration repository in source control that may be used to perform an online installation. The compressed file (e.g., a zip file) containing the container stack deployment files and online install scripts may be generated and either a download to the client may be initiated or the service may automatically deploy to a target machine.

In another example, the CAS may receive a selection from the user to generate an Offline Installer. Responsive to the selection of an offline installer, the CAS may update the container composition files with the selected container image tags for each service. The CAS service downloads script files from the selected configuration repository that are used to perform an offline installation. Next, the CAS service uses a continuous integration (CI) API and uploads the updated container composition files along with the scripts. The CAS adds a new build to the build queue that will start when a build agent may be available. While the build is running, the CAS may check occasionally, via the CI API, for progress updates. Once the build completes, the compressed file package may be uploaded to a remote file storage service via a Storage API and marked with a unique ID. The CAS receives a unique remote storage location for each compressed file package from the CI API by the CAS and returned to the client machine.

Referring now to the figures, FIG. 1 is a schematic view of a well system according to some aspects of the disclosure. A wellbore 118 may be created by drilling into the formation 102 using a drilling system 100 including a drilling system control 120 and a configurator API service (CAS) 122 (e.g., a computing system) positioned at the surface 110. The drilling system 100 may drive a bottom hole assembly (BHA) 104 positioned or otherwise arranged at a downhole end of a drill string 106 extending into the formation 102 from the surface 110. The BHA 104 may include a drill bit 112 and an offline target machine 114. The drill bit 112 may dig into the formation 102. The offline target machine 114 may receive measurement data that may be used by the CAS 122 to describe the formation 102.

For example, the offline target machine 114 may be a downhole sensor that receives information (e.g., electromagnetic, sonic, etc.) from the formation 102. The offline target machine 114 may provide the information to the CAS 122 at the surface 110 for processing to determine various characteristics about the formation 102, physical parameters of the drill bit 112, or other characteristics of the downhole conditions. The CAS 122 may execute one or more software applications that may use the information about downhole conditions received from the offline target machine 114 to determine control parameters or operational adjustments. While the present system may be described with regard to wellbore drilling operations, it can be applied to other aspects of wellbore operations including completions, cementing, and the like.

Figure 2:
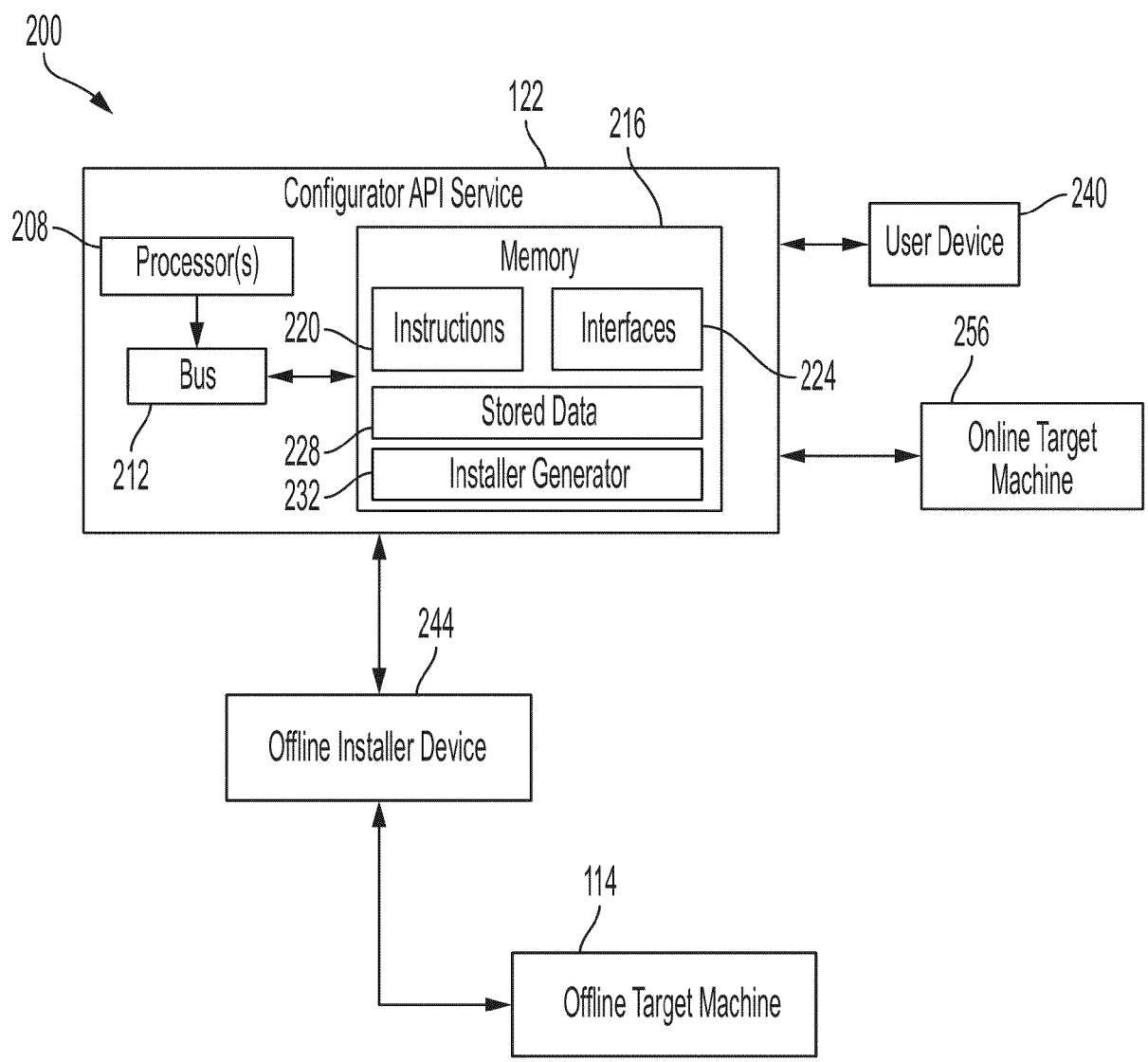
FIG. 2 is a schematic view of a computing system for distributing a containerized installer to a target computing device according to some aspects of the disclosure.

FIG. 2 is a schematic view of a computing system 200 for distributing a containerized installer to a target computing device according to some aspects of the disclosure. In some aspects, the computing system 200 may be used for distributing software application deployments to either a connected or austere computing environment. For instance, the computing system 200 may generate customized installer builds for computing systems that are in distant locations or with limited or no access to computing networks that could be used for distributing a cloud-developed software application. The computing system 200 described herein provides a solution for generating and installing software applications to target machines in such environments. Some examples of target machines are downhole tools that include processors, surface computing systems, and control systems for the wellbore operation.

In an example, a configurator API service 122 (CAS) may be implemented by one or more computing devices. The CAS 122 may include an installer generator 232. The installer generator 232 may be an executable software application, such as instructions 220 (e.g., program code), by a processor 208 of the CAS 122. The processor 208 may be coupled to a memory 216 via a bus 212. The installer generator 232 may receive selections of configurations and generate a customized installer for deployment to a target machine 114 or 256. In one example, the installer generator 232 receives a selection, via a user device 240, of a configuration repository from a user. The installer generator 232 may access the configuration repository in source control, which may be stored in stored data 228. In one aspect, the CAS 122 may provide a user interface to the user device 240 to present to the user. A configuration repository may indicate a particular branch of source code and may include data such as a manifest file and container deployment parameters for the selected configuration repository. The CAS may include multiple sets of source code and container deployment parameters stored in stored data 228.

The installer generator 232 may determine multiple branches of source code that are associated with the selection of the configuration repository. The installer generator 232 may query stored data 228 and collect any available branches of source code that contain a manifest file such as contained in a root location of the code repository. The installer generator 232 generates a list of available branches of source code based on the selection received from the user device 240. The installer generator 232 may provide the list of available branches to the user device 240 for presentation to the user. In another example, the installer generator 232 may determine that a configuration repository does not contain a manifest file in any branch of the repository. In such an example, the installer generator 232 may determine that an error has occurred in the selection from the user and may prompt the user to modify the selected configuration repository or terminate a customized installer generation process.

The installer generator 232 may build a list of container stack names and downloads of associated container composition files for each of the container stack names by accessing information inside of a manifest file. For example, the manifest file may include three available stacks "stack a", "stack b," and "stack c" with associated compose files and files to include in a build. The installer generator 232 may parse various compose files for each container in the list of container stack names. The installer generator 232 may generate a new intermediate object to store a container name of each service, a container image path, or an image tag associated with the container. For each container service, the installer generator 232 can use a Repository API to request the available tags for each image stored in the container repository. The installer generator 232 may append an image tag for an image to each service in the intermediate object. In some aspects, the installer generator 232 may determine a compliance indication of each service according to a set of compatibility rules. The installer generator 232 may determine the compliance indication by querying metadata for each service that may be added to the list of intermediate objects such as a list of micro-services. The installer generator 232 can consider compatibility rules that may have software limitations, hardware limitations, or any combination thereof. The installer generator 232 generates a list of the available containers, branches, or stacks and provides the list to the user device 240 for presentation to the user.

The installer generator 232 may iteratively receive selections of branches via the user interface of the user device 240 until a configuration repository selection process is completed. During the configuration repository selection process, the user makes selections of branches of source code and the installer generator 232 automatically determines the compliance indication by comparing the currently selected branches with the available branches to prevent the user from selecting a branch that may be non-compliant. The installer generator 232 may determine that a particular branch may be non-compliant due to incompatible software, incompatible hardware, or a combination thereof. The installer generator 232 receives an installer type selection from the user device 240.

An example of an installer type may be an Offline Installer that may be downloadable and can install a containerized application on a local target machine. A local target machine may be a computing device that is not connected by a network connection to the configurator API service 122. Another example of an installer type may be an Online Installer that can install a containerized application using a network connection to an online target machine.

In one example, the installer generator 232 may receive a selection from the user device 240 to generate an Online Installer. Responsive to the selection of an Online Installer, the installer generator 232 can update the composition files with the selected container image tags for each service. The installer generator 232 then downloads script files from the selected configuration repository that are used to perform an online installation. The installer generator 232 may generate a compressed file containing the composition files and online install scripts and a download to the client may be initiated. The installer generator 232 may generate a compressed file such as a zip file containing the container stack deployment files and online install scripts. The CAS 122 may provide the compressed file to the online target machine 256.

In another example, the installer generator 232 may receive a selection from the user to generate an Offline Installer. Responsive to the selection of an Offline Installer, the installer generator 232 can update the compose files with the selected container image tags for each service. The installer generator 232 downloads script files from the selected source control repository that are used to perform an offline installation. The installer generator 232 may use a continuous integration (CI) API to generate the updated container composition files along with the scripts. The installer generator 232 adds an installer build task to a build queue that may be stored in stored data 228. The installer generator 232 generates the installer build by traversing the updated container composition files and downloading copies of the container images by tag into a local registry stored in stored data 228. The installer generator 232 may provide local registry data into a compressed file and then compress the local registry data along with the required offline install scripts.

The CAS 122 provides the compressed file download to the offline installer device 244. The offline installer device 244 may be a computing device that connects on a first network connection to the CAS 122 and connects to an offline target machine 114 by a second network connection or interface. In one example, the offline installer device 244 may be a portable computing device that may download the compressed file from the CAS 122. The offline installer device 244 may then disconnect from the CAS 122 and connect to a second network connection or an interface such as a USB storage device, flash memory media, direct connection, and the like. The offline installer device 244 may provide the compressed file to the offline target machine 114 using the second network connection or interface connection.

In one aspect, the CAS 122 may upload the compressed file package to a remote file storage device and associate the compressed file package and installer selection with a unique ID. The CAS 122 generates a unique remote storage location for each compressed file package. The CAS 122 may present, via a user interface on the user device 240, a download link that can be selected to initiate download of the offline installer compressed file to the user device 240, to the offline installer device 244, or to both the user device 240 and the offline installer device 244.

Figure 3:
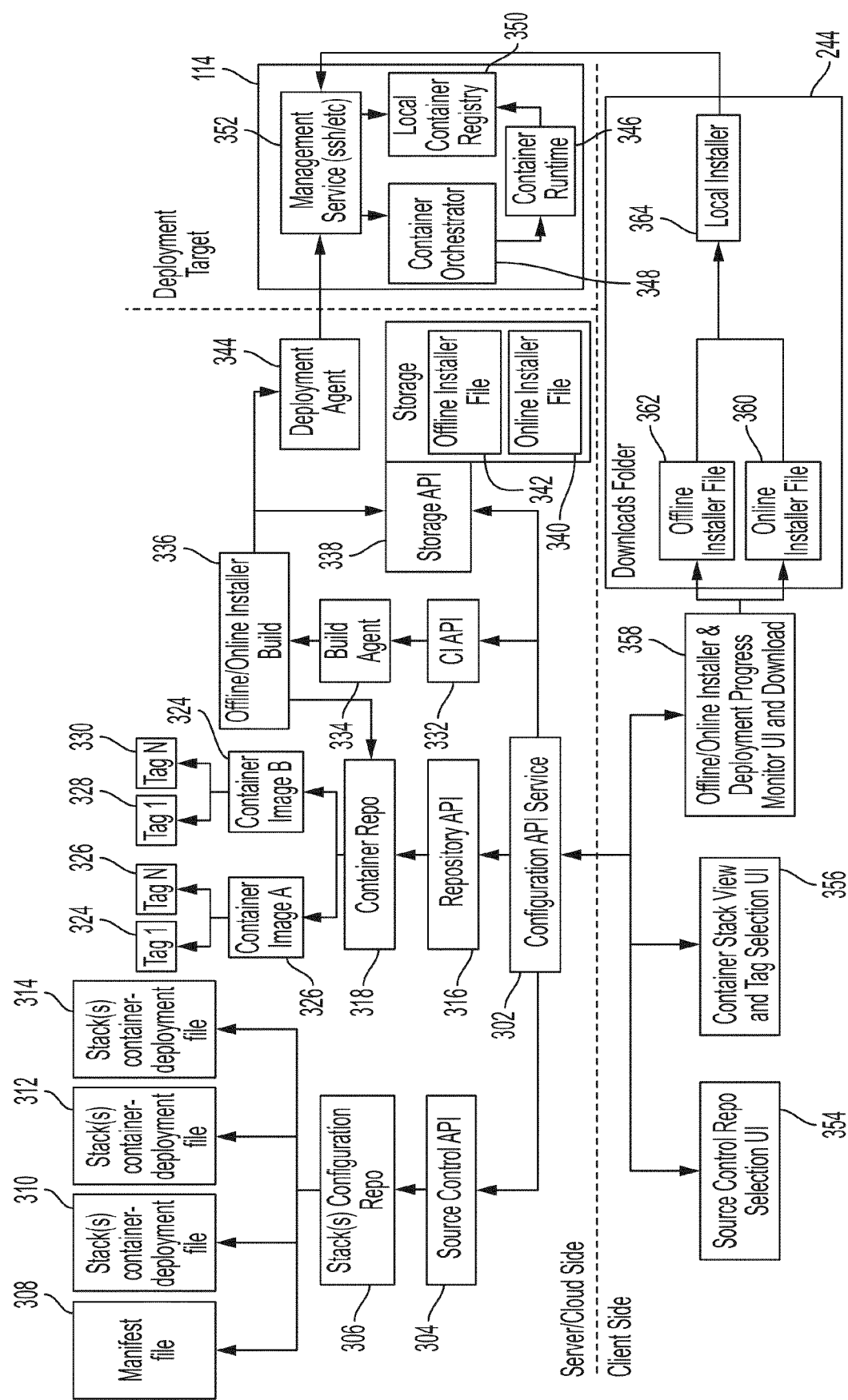
FIG. 3 is a system diagram of a computing system for distributing a containerized installer according to certain aspects of the disclosure.

FIG. 3 is a system diagram of a computing system for distributing a containerized installer according to certain aspects of the disclosure. For example, the CAS 302, may be implemented by a computing system such as CAS 122 for generating customized installer builds for deployment to target machines 114 or 256. The CAS 302 may access or include other components of a software development environment.

The CAS 302 may access various source code files and associated files by using source control API 304. An example of the source control API 304 may be an application programming interface for controlling and coordinating use of source code elements during a software building process. The source control API 304 may include additional elements such as a stack configuration repository 306, a manifest file 308, a stack A compose file 310, a stack B compose file 312, and a stack C compose file 314. The source control API 304 may include any number of stacks, and the associated compose files and manifest files.

The CAS 302 may also include or have access to a repository API 316. The repository API 316 may include other components such as container repository 318, container image A 320, tag A 324, tag B 326, container image B 322, tag C 328, tag D 330. An example of the repository API 316 may be a data access layer that generically includes a representation of repository elements. The repository API 316 may include any number of containers and associated tags.

The CAS 302 may also include or have access to a Continuous Integration (CI) API 332, build agent 334, and offline/online installer build 336. The CI API 332 may be used by the CAS 302 to run compliance testing and evaluate the selection of the user prior to building the customized installer. The CAS 302 may use the build agent 334 to start build processes that compile the customized installer. The build agent 334 outputs the offline/online installer build 336 which may be program code representing the customized installer based on the selection of the user.

The CAS 302 may determine that the offline/online installer build be stored in a remote location using a storage API 338. The storage API 338 may include memory locations for an offline installer file 342, online installer file 340, or may provide another method of determining storage location.

The CAS 302 may provide various interfaces for presentation on the user device 240. The CAS 302 may use the interfaces to receive selections from a user of the user device 240 and provide feedback presented to the user on user device 240. The CAS 302 may utilize a Source Control Repository Selection UI 354, a Container Stack View and Tag Selection UI 356, or an Offline/Online Installer Deployment Progress Monitor 358. The Source Control Repository Selection UI 354 may be a user interface that can receive selections of configuration repositories in source control for a customized installer. The Container Stack View and Tag Selection UI 356 may be a user interface for presenting lists of various container stack details and the associated tags.

The CAS 302 can be communicatively coupled to an offline installer device 244. The offline installer device 244 may include multiple storage devices for storing an offline installer file 362 or an online installer file 360. The offline installer device 244 may include a local installer 364 for deploying the customized installer to management service 352. The offline installer device 244 may deploy the customized installer to an offline target machine 114. The offline target machine 114 may execute the management service 352 to install the customized installer on the offline target machine 114. The offline target machine 114 may employ a container orchestrator 348 and local container registry 350 to manage the deployment of the application on the offline target machine 114. The offline target machine 114 may then execute the container runtime 346.

Figure 4:
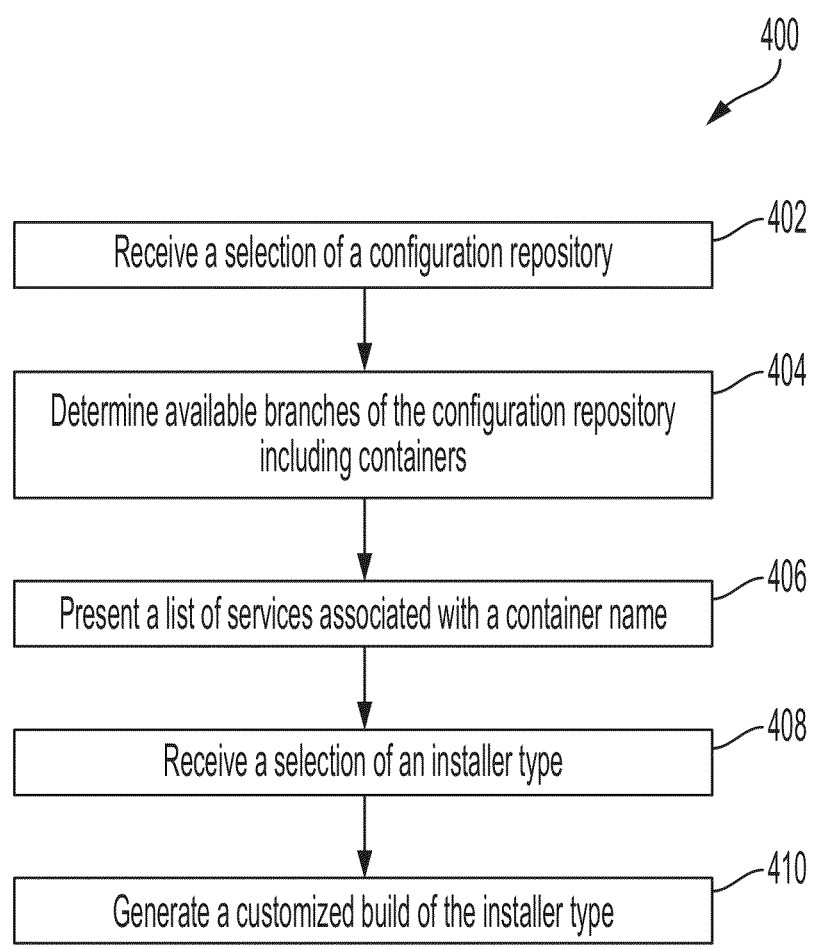
FIG. 4 is an example of a process for generating a customized installer build according to some aspects of the disclosure.

FIG. 4 is an example of a process 400 for generating a customized installer build according to some aspects of the disclosure. At block 402, the process 400 involves receiving or accessing a selection of a configuration repository. For example, the CAS 302 receives a selection of a configuration repository. The installer generator may receive a selection of a code repository in a source code control repository from a user device. The user device may execute an API or receive a user interface for presentation to a user that interacts with the user device to make a selection.

At block 404, the process 400 involves determining available branches of the configuration repository that includes containers. The CAS 302 may access a storage device and query any available branches of source code that contain a manifest file in the code repository. The CAS 302 may generate a list of available branches of source code by determining a compliance indication of each branch within a source code repository with the selection received from the user device. For example, the CAS 302 may determine that a first branch of the source code repository may be compliant with the selection received from the user device. The CAS 302 may add the services associated with the first branch to the list of services associated with the container name.

In another aspect, the CAS 302 may determine that a second branch of the source code repository may be non-compliant (e.g., obsolete version of the second branch, a security flaw with the second branch) with the selection received from the user device. The CAS 302 may disallow the second branch of the source code from being available and may generate an alert to notify the user of a non-compliant service.

At block 406, the process 400 involves presenting a list of services associated with a container name. The CAS 302 may aggregate the available branches, such as the first branch described with regard to block 404. The CAS 302 may present a list of the services associated with the container name, such as through a user interface on the user device.

At block 408, the process 400 involves receiving a selection of an installer type. The CAS 302 receives, from the user device, a selection of an offline installer or an online installer. In another aspect, the CAS 302 may determine, based on the target system, the installer type automatically. The CAS 302 may determine, based on a profile of the user device, containerized application selected, and software or hardware indications an optimal installer type.

At block 410, the process 400 involves generating a customized build of the installer type. The CAS 302 may update files in the source code repository associated with the selected container image tags for the services associated with the selections of the user. The CAS 302 requests all files associated with the selected container image tags from the selected configuration repository in source control that are used to perform an offline installation. The CAS 302 may generate a set of updated container composition files along with the scripts for the associated container image tags. The CAS 302 may add an installer build task to a build queue that may be stored. In another aspect, the CAS 302 may download script files from the selected configuration repository in source control that are used to perform an online installation. The CAS 302 generates a compressed file containing the compose files, online install scripts, and any other files associated with the container. The CAS 302 may transmit the compressed file to the online target machine.

In some aspects, the CAS 302 may transmit the compressed file to an online target machine. For instance, the CAS may generate customized installer builds for computing systems that are in consolidated locations or at distant locations using a satellite or other network connection with a suitable uplink/downlink.

Figure 5:
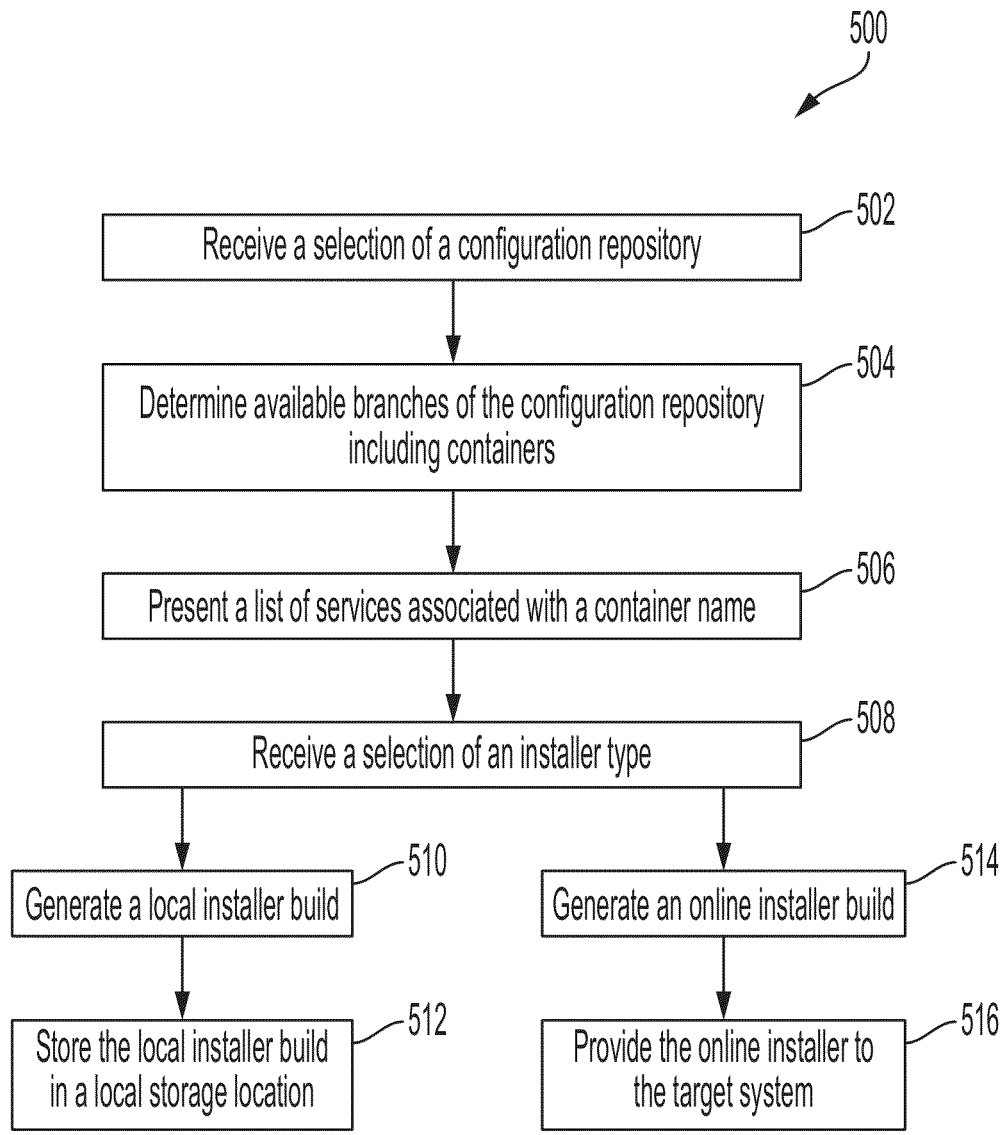
FIG. 5 is an example of another process for generating a customized installer build according to some aspects of the disclosure.

FIG. 5 depicts an example of a process 500 for generating a customized installer build according to some aspects of the disclosure. At block 502, the process 500 involves the CAS 302 receiving a selection of a configuration repository. For example, the CAS 302 receives a selection of a configuration repository. The installer generator may receive a selection of a code repository in a source code control repository from a user device. The user device may execute an API or receive a user interface for presentation to a user that interacts with the user device to make a selection.

At block 504, the process 500 involves determining available branches of the configuration repository including containers in a manner similar to that described with respect to block 404. The CAS 302 may access a storage device and query any available branches of source code that contain a manifest file in the code repository. The CAS 302 may generate a list of available branches of source code by determining a compliance indication of each branch within a source code repository with the selection received from the user device. For example, the CAS 302 may determine that a first branch of the source code repository may be compliant with the selection received from the user device. The CAS 302 may add the services associated with the first branch to the list of services associated with the container name.

At block 506, the process 500 involves presenting a list of the services associated with the container name, such as through a user interface on the user device in a manner similar to that described with respect to block 406. The CAS 302 may aggregate the available branches, such as the first branch described with regard to block 504. The CAS 302 may present a list of the services associated with the container name, such as through a user interface on the user device.

At block 508, the process 500 involves receiving, from the user device, a selection of an offline installer or an online installer in a manner similar to the selection described with respect to block 408. The CAS 302 receives, from the user device, a selection of an offline installer or an online installer. In another aspect, the CAS 302 may determine, based on the target system, the installer type automatically. The CAS may determine based on a profile of the user device, containerized application selected, and software or hardware indications of an optimal installer type.

At block 510, the process 500 involves generating a local installer build. The CAS 302 may update files in the source code repository associated with the selected container image tags for the services associated with the selections of the user. The CAS 302 requests all files associated with the selected container image tags from the selected configuration repository in source control that are used to perform an offline installation. The CAS 302 may generate a set of updated container composition files along with the scripts for the associated container image tags. The CAS 302 adds an installer build task to a build queue that may be stored.

At block 512, the process 500 involves storing the local installer build in a local storage location. The CAS 302 generates the installer build by downloading copies of the container images into a local registry. The CAS 302 stores local registry data into a compressed file and then compresses the local registry data along with the required offline install scripts.

In some aspects, the CAS 302 may store the local installer build in a local storage location such as an offline installer device. For example, a portable device not coupled to a network connection suitable for receiving compressed files, a device for sending software applications to a downhole tool. For instance, the CAS may generate customized installer builds for computing systems that are in distant or austere locations such as at a distributed group of wellbore sites in an oil field or at distant locations unreachable by suitable networks for receiving compressed files.

At block 514, the process 500 involves generating an online installer build. The CAS 302 downloads script files from the selected configuration repository in source control that are used to perform an online installation. The CAS 302 generates a compressed file containing the compose files, online install scripts, and any other files associated with the container. The CAS 302 transmits the compressed file to the online target machine.

At block 516, the process 500 involves providing an online install to the target system. The CAS 302 can transmit the compressed file to the online target machine via a network interface. For example, the CAS 302 may transmit the compressed file to an online target machine (e.g., a computing device coupled to a network connection suitable for receiving compressed files). For instance, the CAS may generate customized installer builds for computing systems that are in consolidated locations (e.g., centralized facilities) or at distant locations using a satellite or other network connection with a suitable uplink/downlink.

As used below, any reference to a series of examples is to be understood as a reference to each of those examples disjunctively (e.g., "Examples 1-4" is to be understood as "Examples 1, 2, 3, or 4").

Example 1 is a method comprising: receiving, by a user interface, a selection from a user of a configuration repository; determining available branches of the configuration repository that includes images, tags, and container names; presenting a list of services associated with the container names; receiving, by a user interface, a selection of an installer type; generating a customized build of the installer type, wherein the customized build comprises: an offline installer that is deployable on an offline target machine using a first communication media; or an online installer that is deployable to an online target machine using a second communication media; and distributing the customized build to a wellbore computing network, responsive to a selection of the installer type.

Example 2 is the method of example 1, wherein determining available branches of the configuration repository including images, tags, and container names comprises: identifying one or more branches of the configuration repository associated with the selection of the user; determining a compliance indication for each of the one or more branches of the configuration repository and the selection of the user; and setting an availability for each of the one or more branches based on the compliance indication.

Example 3 is the method of example 2, wherein setting an availability for each of the one or more branches based on the compliance indication comprises: responsive to a non-compliance indication, setting one or more branches as unavailable to a branch selection from the user; and requesting, from the user, an alternative branch selection of one or more branches.

Example 4 is the method of examples 1-3, wherein determining available branches of the configuration repository including images, tags, and container names comprises: generating a manifest file that includes a list of a plurality of micro-services and a plurality of versions of the plurality of micro-services, wherein the manifest file groups the list of the plurality of micro-services associated with the selection from the user by version.

Example 5 is the method of examples 1-3, wherein the selection of an installer type comprises: selecting an online installer that is provided to a target machine by a first communication network; and selecting an offline installer that is provided to an offline installer device by the first communication network and is further provided from the offline installer to the target machine by a second communication network.

Example 6 is the method of examples 1-3, further comprising: transmitting the online installer to a target machine using the first communication network; and transmitting the offline installer to the offline installer device using the first communication network, wherein the offline installer device transmits the offline installer to the target machine on the second communication network.

Example 7 is the method of examples 1-3, wherein determining a compliance indication for each of the one or more branches of the configuration repository comprises determining a non-compliance indication by detecting a conflict of a first branch of the one or more branches with a version of a second branch of the one or more branches, an obsolete version of the first branch, a security flaw with the first branch, or any combination thereof.

Example 8 is a non-transitory computer-readable medium that includes instructions that are executable by a processing device for causing the processing device to perform operations relating to a wellbore computing network, the operations comprising: receiving, by a user interface, a selection from a user of a configuration repository; determining available branches of the configuration repository that includes images, tags, and container names; presenting a list of services associated with the container names; receiving, by a user interface, a selection of an installer type; generating a customized build of the installer type, wherein the customized build comprises: an offline installer that is deployable on an offline target machine using a first communication media; or an online installer that is deployable to an online target machine using a second communication media; and distributing the customized build to a wellbore computing network, responsive to selection of installer type.

Example 9 is the non-transitory computer-readable medium of example 8, wherein the operation of determining available branches of the configuration repository that includes images, tags, and container names comprises: identifying one or more branches of the configuration repository associated with the selection of the user; determining a compliance indication for each of the one or more branches of the configuration repository and the selection of the user; and setting an availability for each of the one or more branches based on the compliance indication.

Example 10 is the non-transitory computer-readable medium of example 9, wherein the operation of setting an availability for each of the one or more branches based on the compliance indication comprises: responsive to a non-compliance indication, setting one or more branches as unavailable to a branch selection from the user; and requesting, from the user, an alternative branch selection of one or more branches.

Example 11 is the non-transitory computer-readable medium of example 10, wherein the operation of determining available branches of the configuration repository comprises: generating a manifest file that includes a list of a plurality of micro-services, a plurality of versions of the plurality of micro-services, wherein the manifest file groups the list of the plurality of micro-services associated with the selection from the user by version.

Example 12 is the non-transitory computer-readable medium of example 11, wherein the operation of selecting of an installer type comprises: selecting an online installer provided to a target machine by a first communication network; and selecting an offline installer provided to an offline installer device by the first communication network and further provided from the offline installer to the target machine by a second communication network.

Example 13 is the non-transitory computer-readable medium of examples 10-12, the operations further comprising: transmitting the online installer to a target machine using the first communication network; and transmitting the offline installer to an offline installer device using the first communication network, wherein the offline installer device transmits the offline installer to the target machine on the second communication network.

Example 14 is the non-transitory computer-readable medium of examples 10-12, wherein the operation of determining a compliance indication for each of the one or more branches of the configuration repository comprises determining a non-compliance indication by detecting a conflict of a first branch of the one or more branches with a version of a second branch of the one or more branches, an obsolete version of the first branch, a security flaw with the first branch, or any combination thereof.

Example 15 is a system comprising: a wellbore computing network including a computing device and a target machine; the computing device comprising: a processor; and a non-transitory memory device communicatively coupled to the processor comprising instructions that are executable by the processor to cause the processor to perform operations comprising: receiving, by a user interface, a selection from a user of a configuration repository; determining available branches of the configuration repository including images, tags, and container names; presenting a list of services associated with the container names; receiving, by a user interface, a selection of an installer type; and generating a customized build of the installer type, wherein the customized build comprises: the target machine comprising: a target processor; and a target non-transitory memory device communicatively coupled to the processor comprising instructions that are executable by the target processor to cause the target processor to perform target operations comprising: receiving, from the computing device, an offline installer using a first communication media; or receiving, from the computing device, an online installer using a second communication media.

Example 16 is the system of example 15, wherein the operation of the processor for determining available branches of the configuration repository comprises: identifying one or more branches of the configuration repository associated with the selection of the user; determining a compliance indication for each of the one or more branches of the configuration repository and the selection of the user; and setting an availability for each of the one or more branches based on the compliance indication.

Example 17 is the system of example 16, wherein the operation of the processor for setting an availability for each of the one or more branches based on the compliance indication comprises: responsive to a non-compliance indication, setting one or more branches as unavailable to the branch selection from the user; and requesting, from the user, an alternative branch selection of one or more branches.

Example 18 is the system of example 15-17, wherein the operation of the processor for determining available branches of the configuration repository comprises: generating a manifest file that includes a list of a plurality of micro-services and a plurality of versions of the plurality of micro-services, wherein the manifest file groups the list of the plurality of micro-services associated with the selection from the user by version.

Example 19 is the system of examples 15-17, wherein the operation of the processor for the selecting of an installer type comprises: selecting an online installer that is provided to a target machine by a first communication network; and selecting an offline installer that is provided to an offline installer device by the first communication network and is further provided from the offline installer to the target machine by a second communication network.

Example 20 is the system of examples 15-17, wherein the operation of the processor for the selecting of an installer type further comprises: transmitting the online installer to a target machine using the first communication network; and transmitting the offline installer to an offline installer device using the first communication network, wherein the offline installer device transmits the offline installer to the target machine on the second communication network.

The foregoing description of certain embodiments, including illustrated embodiments, has been presented only for the purpose of illustration and description and may not be intended to be exhaustive or to limit the disclosure to the precise forms disclosed. Numerous modifications, adaptations, combinations, and uses thereof are possible without departing from the scope of the disclosure.

What may be claimed is:

1. A method comprising:
receiving, by a user interface, a selection from a user of a configuration repository;
determining available branches of the configuration repository that includes images, tags, and container names;
presenting a list of services associated with the container names;
receiving, by a user interface, a selection of an installer type;
generating a customized build of the installer type, wherein the customized build comprises:
an offline installer that is deployable on an offline target machine using a first communication media; or
an online installer that is deployable to an online target machine using a second communication media; and
distributing the customized build to a wellbore computing network, responsive to a selection of the installer type.

2. The method of claim 1, wherein determining available branches of the configuration repository including images, tags, and container names comprises:
identifying one or more branches of the configuration repository associated with the selection of the user;
determining a compliance indication for each of the one or more branches of the configuration repository and the selection of the user; and
setting an availability for each of the one or more branches based on the compliance indication.

3. The method of claim 2, wherein setting an availability for each of the one or more branches based on the compliance indication comprises:
responsive to a non-compliance indication, setting one or more branches as unavailable to a branch selection from the user; and
requesting, from the user, an alternative branch selection of one or more branches.

4. The method of claim 1, wherein determining available branches of the configuration repository including images, tags, and container names comprises:
generating a manifest file that includes a list of a plurality of micro-services and a plurality of versions of the plurality of micro-services, wherein the manifest file groups the list of the plurality of micro-services associated with the selection from the user by version.

5. The method of claim 1, wherein the selection of an installer type comprises:
selecting an online installer that is provided to a target machine by a first communication network; and
selecting an offline installer that is provided to an offline installer device by the first communication network and is further provided from the offline installer to the target machine by a second communication network.

6. The method of claim 5, further comprising:
transmitting the online installer to a target machine using the first communication network; and
transmitting the offline installer to the offline installer device using the first communication network, wherein the offline installer device transmits the offline installer to the target machine on the second communication network.

7. The method of claim 1, wherein determining a compliance indication for each of the one or more branches of the configuration repository comprises determining a non-compliance indication by detecting a conflict of a first branch of the one or more branches with a version of a second branch of the one or more branches, an obsolete version of the first branch, a security flaw with the first branch, or any combination thereof.

8. A non-transitory computer-readable medium that includes instructions that are executable by a processing device for causing the processing device to perform operations relating to a wellbore computing network, the operations comprising:
receiving, by a user interface, a selection from a user of a configuration repository;
determining available branches of the configuration repository that includes images, tags, and container names;
presenting a list of services associated with the container names;
receiving, by a user interface, a selection of an installer type;
generating a customized build of the installer type, wherein the customized build comprises:
an offline installer that is deployable on an offline target machine using a first communication media; or
an online installer that is deployable to an online target machine using a second communication media; and
distributing the customized build to a wellbore computing network, responsive to selection of installer type.

9. The non-transitory computer-readable medium of claim 8, wherein the operation of determining available branches of the configuration repository that includes images, tags, and container names comprises:
identifying one or more branches of the configuration repository associated with the selection of the user;
determining a compliance indication for each of the one or more branches of the configuration repository and the selection of the user; and
setting an availability for each of the one or more branches based on the compliance indication.

10. The non-transitory computer-readable medium of claim 9, wherein the operation of setting an availability for each of the one or more branches based on the compliance indication comprises:
responsive to a non-compliance indication, setting one or more branches as unavailable to a branch selection from the user; and
requesting, from the user, an alternative branch selection of one or more branches.

11. The non-transitory computer-readable medium of claim 8, wherein the operation of determining available branches of the configuration repository comprises:
generating a manifest file that includes a list of a plurality of micro-services, a plurality of versions of the plurality of micro-services, wherein the manifest file groups the list of the plurality of micro-services associated with the selection from the user by version.

12. The non-transitory computer-readable medium of claim 8, wherein the operation of selecting of an installer type comprises:
selecting an online installer provided to a target machine by a first communication network; and
selecting an offline installer provided to an offline installer device by the first communication network and further provided from the offline installer to the target machine by a second communication network.

13. The non-transitory computer-readable medium of claim 12, the operations further comprising:
transmitting the online installer to a target machine using the first communication network; and
transmitting the offline installer to an offline installer device using the first communication network, wherein the offline installer device transmits the offline installer to the target machine on the second communication network.

14. The non-transitory computer-readable medium of claim 8, wherein the operation of determining a compliance indication for each of the one or more branches of the configuration repository comprises determining a non-compliance indication by detecting a conflict of a first branch of the one or more branches with a version of a second branch of the one or more branches, an obsolete version of the first branch, a security flaw with the first branch, or any combination thereof.

15. A system comprising:
   a wellbore computing network including a computing device and a target machine;
   the computing device comprising:
      a processor; and
      a non-transitory memory device communicatively coupled to the processor comprising instructions that are executable by the processor to cause the processor to perform operations comprising:
         receiving, by a user interface, a selection from a user of a configuration repository;
         determining available branches of the configuration repository including images, tags, and container names;
         presenting a list of services associated with the container names;
         receiving, by a user interface, a selection of an installer type; and
         generating a customized build of the installer type, wherein the customized build comprises:
   the target machine comprising:
      a target processor; and
      a target non-transitory memory device communicatively coupled to the processor comprising instructions that are executable by the target processor to cause the target processor to perform target operations comprising:
         receiving, from the computing device, an offline installer using a first communication media; or
         receiving, from the computing device, an online installer using a second communication media.

16. The system of claim 15, wherein the operation of the processor for determining available branches of the configuration repository comprises:
   identifying one or more branches of the configuration repository associated with the selection of the user;
   determining a compliance indication for each of the one or more branches of the configuration repository and the selection of the user; and
   setting an availability for each of the one or more branches based on the compliance indication.

17. The system of claim 16, wherein the operation of the processor for setting an availability for each of the one or more branches based on the compliance indication comprises:
   responsive to a non-compliance indication, setting one or more branches as unavailable to the branch selection from the user; and
   requesting, from the user, an alternative branch selection of one or more branches.

18. The system of claim 15, wherein the operation of the processor for determining available branches of the configuration repository comprises:
   generating a manifest file that includes a list of a plurality of micro-services and a plurality of versions of the plurality of micro-services, wherein the manifest file groups the list of the plurality of micro-services associated with the selection from the user by version.

19. The system of claim 15, wherein the operation of the processor for the selecting of an installer type comprises:
   selecting an online installer that is provided to a target machine by a first communication network; and
   selecting an offline installer that is provided to an offline installer device by the first communication network and is further provided from the offline installer to the target machine by a second communication network.

20. The system of claim 19, wherein the operation of the processor for the selecting of an installer type further comprises:
   transmitting the online installer to a target machine using the first communication network; and
   transmitting the offline installer to an offline installer device using the first communication network, wherein the offline installer device transmits the offline installer to the target machine on the second communication network.

* * * * *